UNITED STATES PATENT OFFICE.

ESEK C. ROBERTS, OF SALEM, MICHIGAN.

IMPROVED MODE OF PRESERVING FRUIT AND VEGETABLES.

Specification forming part of Letters Patent No. 35,626, dated June 17, 1862.

*To all whom it may concern:*

Be it known that I, E. C. ROBERTS, of Salem, in the county of Washtenaw and State of Michigan, have discovered a new and improved mode of preserving fruit and vegetables of all kinds in a perfect state; and I do hereby declare that the following is a full and complete description thereof.

The nature of my invention or discovery consists in preserving fruit and vegetables in their fresh and natural state by keeping the same at a low temperature, nearly but not to the freezing-point, by means of snow and ice, as hereinafter described.

Some fruit and vegetables are first packed in boxes or cans of any convenient size, which boxes or other vessels are sufficiently tight to preserve the contents from contact with the snow in which they are packed. I prefer boxes that are about eighteen inches wide, three feet long, and from two to three feet deep. These, when filled with fruit or vegetables, are placed in a suitable house, built like an ice-house, and provided with means for thorough drainage. The boxes should be placed about two feet apart, and in tiers one above another, and the space between and around them to the distance of about two feet filled in with clean dry snow. A wall composed of nicely-fitting slabs of ice about eighteen inches in thickness is built up around the tiers of boxes containing the fruit, and protected from the action of the atmosphere by the double walls of the ice-house. The whole of the packages thus inclosed in snow and ice should be covered with straw, as is usual in the preservation of ice in ice-houses. The snow, being porous, is capable of absorbing the normal temperature of the fruit, thus reducing it to a low temperature without freezing, and the moisture contained in the air in the interstices of the fruit is also radiated and absorbed by the snow.

What I claim as my discovery, and for which I desire Letters Patent of the United States, is—

The preservation of fruit and vegetables by the combined action of snow and ice when placed around the boxes containing the fruit or vegetables, as herein set forth.

ESEK C. ROBERTS.

Witnesses:
    THOS. D. LANE,
    DAVID DUNLAP.